US012365192B2

(12) United States Patent
Inui et al.

(10) Patent No.: US 12,365,192 B2
(45) Date of Patent: Jul. 22, 2025

(54) EJECTING UNIT AND IMAGE FORMING APPARATUS

(71) Applicants: KYOCERA Document Solutions Inc., Osaka (JP); KYOCERA Corporation, Kyoto (JP)

(72) Inventors: Yasutaka Inui, Osaka (JP); Naoto Miyakoshi, Osaka (JP); Issei Nakano, Osaka (JP); Takuma Araki, Osaka (JP); Yuuji Mizutani, Kyoto (JP); Takashi Miyahara, Kyoto (JP); Misaki Nomoto, Kyoto (JP)

(73) Assignees: KYOCERA Document Solutions Inc., Osaka (JP); KYOCERA Corporation, Kyoto (JP)

( * ) Notice: Subject to any disclaimer, the term of this patent is extended or adjusted under 35 U.S.C. 154(b) by 196 days.

(21) Appl. No.: 18/325,740

(22) Filed: May 30, 2023

(65) Prior Publication Data

US 2024/0001677 A1 Jan. 4, 2024

(30) Foreign Application Priority Data

Jun. 30, 2022 (JP) ................................ 2022-105399

(51) Int. Cl.
*B41J 25/304* (2006.01)
*B41J 2/165* (2006.01)

(52) U.S. Cl.
CPC ......... *B41J 25/304* (2013.01); *B41J 2/16538* (2013.01); *B41J 2/16544* (2013.01); *B41J 2/16526* (2013.01)

(58) Field of Classification Search
CPC .. B41J 25/304; B41J 2/16538; B41J 2/16544; B41J 2/16526
See application file for complete search history.

(56) References Cited

U.S. PATENT DOCUMENTS

| | | | | |
|---|---|---|---|---|
| 6,467,873 | B1 * | 10/2002 | Toba | B41J 2/16538 347/33 |
| 6,679,578 | B2 * | 1/2004 | Arakawa | B41J 2/16547 347/33 |
| 8,197,026 | B2 * | 6/2012 | Kato | B41J 29/02 347/22 |
| 8,573,742 | B2 * | 11/2013 | Petersen | B41J 2/17553 239/589 |

FOREIGN PATENT DOCUMENTS

| | | |
|---|---|---|
| JP | 2001-310476 A | 11/2001 |

* cited by examiner

*Primary Examiner* — Geoffrey S Mruk
(74) *Attorney, Agent, or Firm* — Studebaker Brackett PLLC

(57) ABSTRACT

An image forming apparatus includes a recording head, a wiper and a head mounting member. The recording head is provided with a nozzle area where a number of ink ejection ports are opened downward. The wiper is configured to move in a wiping direction while coming into contact with the nozzle area to wipe the nozzle area. The head mounting member is provided on a side surface of the recording head in the wiping direction. The surface of the head mounting member has water repellency higher than the side surface of the recording head. A recess portion and a protrusion are alternatively provided in a lower end portion of the head mounting member.

14 Claims, 7 Drawing Sheets

EJECTING UNIT AND IMAGE FORMING APPARATUS

INCORPORATION BY REFERENCE

This application is based on and claims the benefit of priority from Japanese patent application No. 2022-105399 filed on Jun. 30, 2022, which is incorporated by reference in its entirety.

BACKGROUND

The present disclosure relates to an ejecting unit including a recording head and an inkjet image forming apparatus including a wiper wiping an ink ejection port of the recording head.

An inkjet image forming apparatus includes a wiper which wipes an ink ejection port of a nozzle of a recording head. The wiper moves in one direction from a wiping start position to a wiping end position while coming into contact with a nozzle area where the ink ejection ports are opened, so that the ink ejection ports are wiped.

In the wiping operation, the wiped ink may be protruded from the wiper, go around the side surface of the recording head, rise along the side surface and then accumulate. On repeating the wiping operation, an amount of the accumulated ink is increased. Then, the accumulated ink may drop on a sheet to cause image failure or may contaminate the inside of the apparatus.

Then, a head cover may be provided to cover the side surface of the recording head. The side surface and the front surface of the head cover is applied with water repellent treatment. Thus, if the ink may go around the side surface of the recording head, the ink is repelled by the head cover, so that it becomes possible to decrease an amount of the ink adhering on the side surface of the recording head.

However, when the head cover described above is provided, no small gap is formed between the head cover and the recording head, and the wiped ink may get into this gap. If an amount of the ink that gets into the gap is large, the ink may drop and cause the image failure and the contamination of the inside of the apparatus as described above.

SUMMARY

An image forming apparatus according to the present disclosure includes a recording head, a wiper and a head mounting member. The recording head is provided with a nozzle area where a number of ink ejection ports are opened downward. The wiper is configured to move in a wiping direction while coming into contact with the nozzle area to wipe the nozzle area. The head mounting member is provided on a side surface of the recording head in the wiping direction. The surface of the head mounting member has water repellency higher than the side surface of the recording head. A recess portion and a protrusion are alternatively provided in a lower end portion of the head mounting member.

An ejecting unit according to the present disclosure includes a recording head and a head mounting member. The recording head is elongated in one direction and provided with a nozzle area where a number of ink ejection ports are opened downward. The head mounting member is provided on a side surface of the recording head in a longitudinal direction of the recording head. A surface of the head mounting member has water repellency higher than the side surface of the recording head. A recess portion and a protrusion portion are alternatively provided in a lower end portion of the head mounting member.

An image forming apparatus according to the present disclosure includes the ejecting unit and a wiper configured to move in a wiping direction while coming into contact with the nozzle area to wipe the nozzle area.

The objects, features, and advantages of the present disclosure will become more apparent from the following description. In the detailed description, reference is made to the accompanying drawings, and preferred embodiments of the present disclosure are shown by way of example in the accompanying drawings.

DETAILED DESCRIPTION

Hereinafter, with reference to the attached drawings, an image forming apparatus according to one embodiment in the present disclosure will be described.

Figure 1:
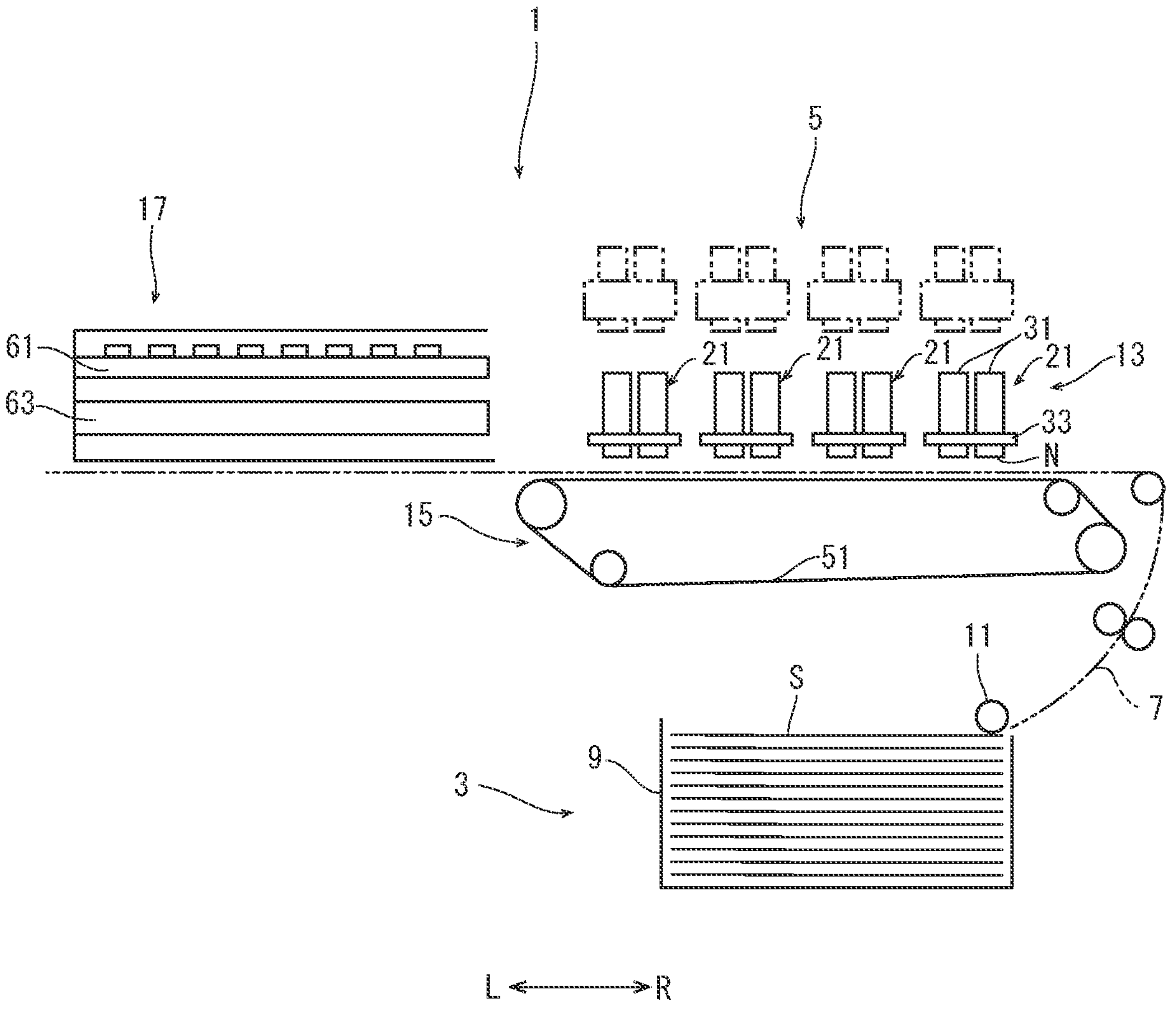
FIG. 1 is a front view schematically showing an inner structure of an image forming apparatus according to one embodiment of the present disclosure.

With reference to FIG. 1, the image forming apparatus 1 will be described. FIG. 1 is a front view schematically showing an internal structure of the image forming apparatus 1 (at the time of image forming operation). Fr, Rr, L and R in each figure indicate the front, rear, left and right directions of the image forming apparatus 1.

The image forming apparatus 1 includes a sheet feeding part 3, an inkjet type image forming part 5, and a conveyance path 7 along which the sheet S fed by the sheet feeding part 3 is conveyed to an ejection port (not shown) through the image forming part 5. The sheet feeding part 3 includes a sheet feeding cassette 9 in which the sheets S are housed and a sheet feeding device 11 which feeds the sheet S from the sheet feeding cassette 9 to the conveyance path 7. The image forming part 5 includes a head unit 13, a conveyance unit 15, and a maintenance unit 17.

First, the head unit 13 will be described. The head unit 13 is provided with four ejecting units 21 corresponding to four colors (yellow, magenta, cyan and black) of ink. The four ejecting units 21 are arranged in parallel in a sheet conveyance direction (the left direction) along the conveyance path 7.

Figure 2:
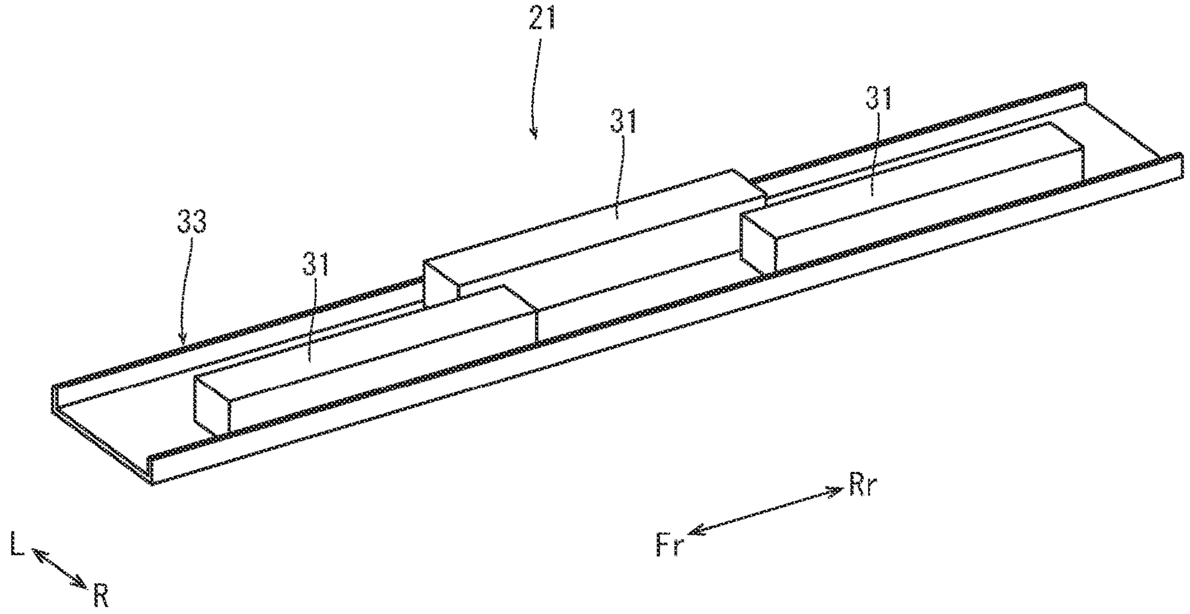
FIG. 2 is a perspective view showing an ejecting unit of the image forming apparatus according to one embodiment of the present disclosure.

Next, the ejecting unit 21 will be described with reference to FIG. 2. FIG. 2 is a perspective view showing the ejecting unit 21.

The ejecting unit 21 includes three recording heads 31 and a head base 33 on which the three recording heads 31 are supported.

The recording head 31 has a rectangular parallelepiped shape long in the front-and-rear direction, and is provided with a number of nozzles arranged in the front-and-rear direction and in the left-and-right direction. The front-and-rear direction is an example of one direction in the disclosure. The ink discharge port of each nozzle opens on the lower side surface of the recording head 31. Each nozzle ejects the ink downward from the ink ejection port by an ink ejection method such as a piezo or thermal method. The area where the ink ejection ports are opened on the lower side surface of the recording head 31 is defined as a nozzle area N.

The head base 33 is a flat plate member long in the front-and-rear direction. The three recording heads 31 are supported on the head base 33 in a staggered arrangement along the front-and-rear direction. Each recording head 31 is supported so that the nozzle area N projects downward from the lower surface of the head base 33. The recording head 31 is made of metal such as SUS, for example. The configuration of the recording head 31 will be described later.

With reference to FIG. 1 again, the head unit 13 is supported in a liftable and lowerable manner to a printing position (see the solid line in FIG. 1) where the image forming operation is performed and to a retreating position (see the two-dotted chain line in FIG. 1) where the maintenance and protection of the head unit 13 is performed.

Next, the conveyance unit 15 will be described with reference to FIG. 1. The conveyance unit 15 includes a conveyance belt 51 which is wound between rollers spaced apart in the left-and-right direction, and circulates in the counterclockwise direction of FIG. 1. The upper traveling surface of the conveyance belt 51 forms a part of the conveyance path 7 passing through the image forming part 5. When the head unit 13 is lowered to the printing position, the nozzle area N of each recording head 31 of the four ejecting units 21 approaches the upper traveling surface of the conveyance belt 51.

During the image forming operation, the head units 13 are lowered to the printing position. The sheet S fed by the sheet feeding part 3 is conveyed along the conveyance path 7 to the image forming part 5. In the image forming part 5, the ink is ejected from the recording head 31 of each ejecting unit 21 to the sheet S conveyed by the conveyance belt 51 based on the image data, and an image is formed on the sheet S.

Next, the maintenance unit 17 will be described with reference to FIG. 1. The maintenance unit 17 includes a capping unit 61 and a wiping unit 63.

The capping unit 61 includes a cap corresponding to each recording head 31 of each ejecting unit 21 of the head unit 13. The capping unit 61 is supported so as to move in the left-and-right direction between a retreating position on the left side of the head unit 13 and a capping position below the head unit 13 lifted to the retreating position. By moving the capping unit 61 to the capping position and then lowering the head unit 13, each cap is pressed against the head base 33 so as to cover the nozzle area N of each recording head 31.

Figure 3:
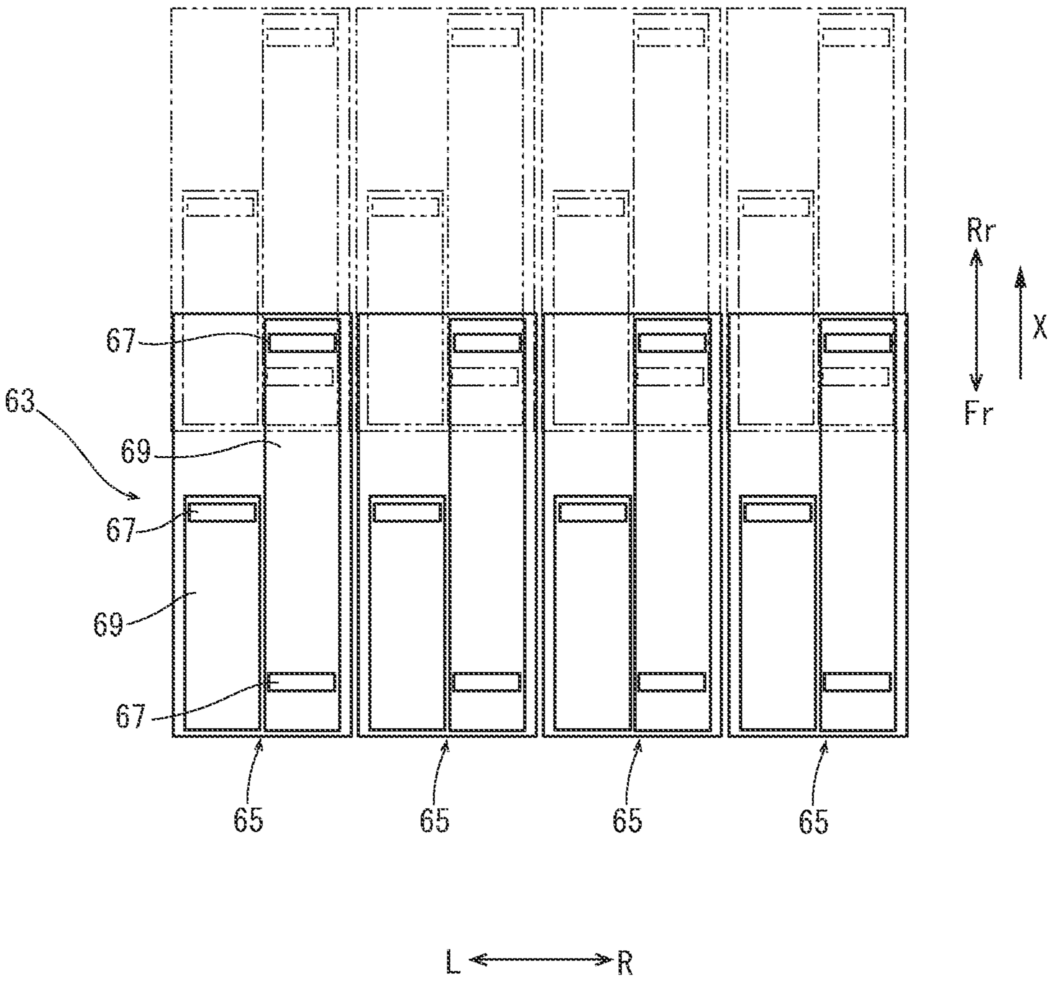
FIG. 3 is a plan view showing a cleaning unit of the image forming apparatus according to one embodiment of the present disclosure.

The wiping unit 63 will be described with reference to FIG. 1 and FIG. 3. FIG. 3 is a plan view showing the wiping unit 63. The wiping unit 63 is provided with four wiper carriages 65 corresponding to the four ejecting units 21 of the head unit 13. The wiper carriage 65 is supported so as to be movable in the front-and-rear direction. The wiper carriage 65 is provided with three wipers 67 corresponding to the three recording heads 31 of the ejecting unit 21 and a tray 69 on which the ink wiped by each wiper 67 is collected. The wiper 67 may be, for example, a blade made of elastic material or an elastic blade or roller around which a cloth is bonded. The wiping unit 63 is supported so as to be movable in the left-and-right direction between a retreating position on the left side of the head unit 13 and a wiping position below the head unit 13 lifted to the retreating position.

After the wiping unit 63 is moved to the wiping position, the head unit 13 is lowered to bring the wiper 67 into contact with the nozzle area N, and each wiper carriage 65 is moved from a front wiping start position (see the solid line in FIG. 3) to a rear wiping finish position (see the two-dotted chain line in FIG. 3) so that the nozzle area N of each recording head 31 (see FIG. 2) of each ejecting unit 21 is wiped by the wiper 67 of the wiper carriage 65. The ink wiped by the wiper 67 drops on the tray 69, and is collected through a collection port (not shown). The moving direction of the wiper carriage 65 is defined as a wiping direction X. In this embodiment, the wiping direction X is a direction from the front to the rear.

Figure 4A:
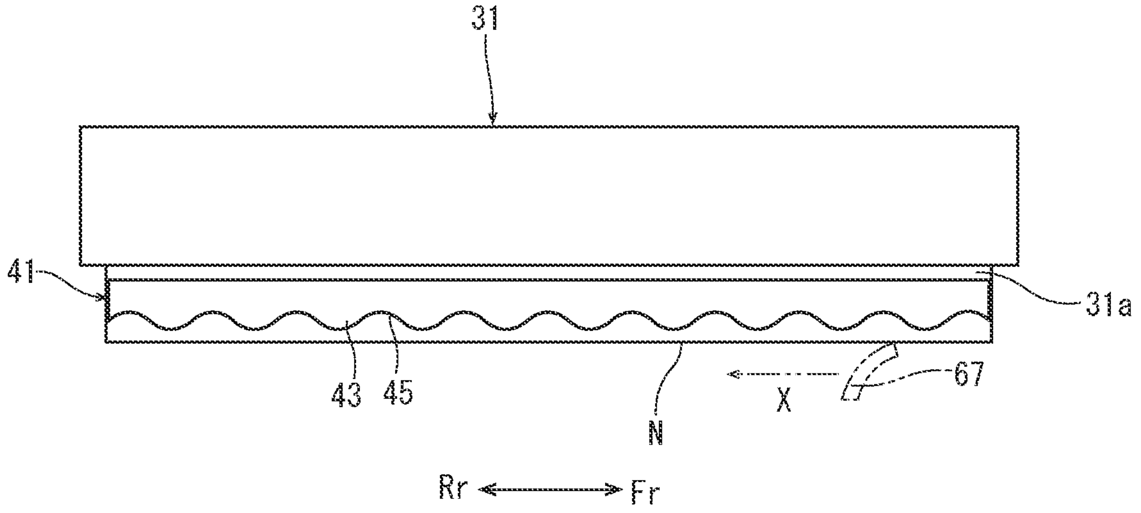
FIG. 4A is a side view showing a recording head of the image forming apparatus according to one embodiment of the present disclosure.
Figure 4B:
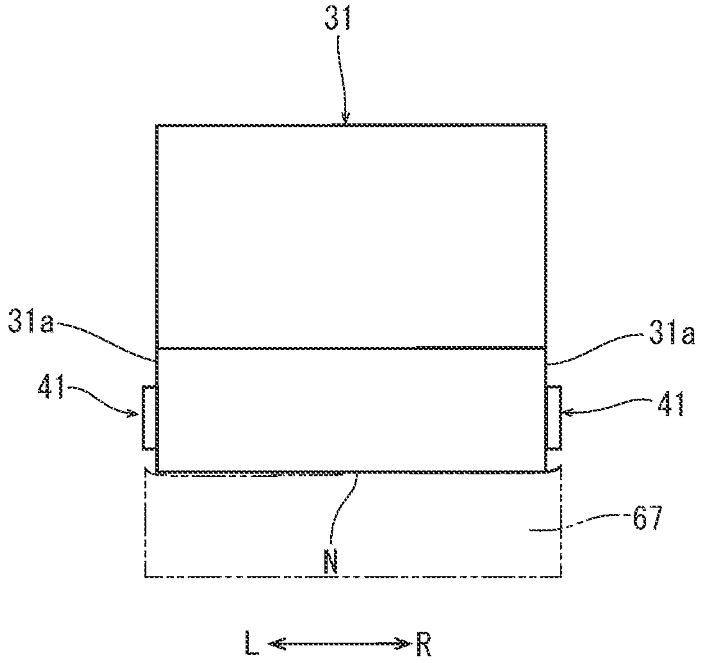
FIG. 4B is a front view showing the recording head of the image forming apparatus according to one embodiment of the present disclosure.

Next, the recording head 31 will be described with reference to FIG. 4A and FIG. 4B. FIG. 4A is a view of the recording head 31 viewed from the left side, and FIG. 4B is a view of the recording head 31 viewed from the front side.

A head mounting member 41 is formed on the side surface 31*a* of the recording head 31 along the wiping direction X (the front-and-rear direction). More specifically, in the wiping direction X, the head mounting members 41 are formed on both the side surfaces 31*a* of the nozzle area N along the longitudinal direction (the front-and-rear direction, that is the wiping direction X) of the recording head 31. As shown in FIG. 4B, the head mounting member 41 is formed in a rectangular parallelepiped shape having a cross section long in the upper-and-lower direction viewed from the front-and-rear direction, and is formed at a position higher than the nozzle area N. As an example, the distance between the head mounting member 41 and the nozzle area N is 0.1 mm. In this case, the side surface 31*a* of the recording head 31 is the surface adjacent to the lower side surface where the nozzle area N exists, and is generally the surface extending upward.

As shown in FIG. 4A, the lower end portion of the head mounting member 41 has a wavey convex-and-concave shape in which an approximately semicircular protrusion portion 43 protruding downward and an approximately semicircular recess portion 45 recessed downward are alternatively formed when viewed from the left-and-right direction. Specifically, the protrusion portion 43 is smaller in width as does downward, and the recess portion 45 is larger in width as goes downward. The head mounting member 41 is made of material (for example, silicone and fluorinated resins) having higher water repellency than the side surface 31*a* of the recording head 31. In other words, the contact angle of the ink to the surface of the head mounting member

41 is larger than the contact angle of the ink to the side surface 31*a* of the recording head 31. Alternately, the head mounting member 41 may be coated with a material with high water repellency only on the surface. As an example, the head mounting member 41 is 0.2 to 0.3 mm thick.

The head mounting member 41 is fixed to the side surface 31*a* of the recording head 31 by, for example, a double-sided tape, an adhesive, a thermal fusion method or the like so as to project from the side surface 31*a* of the recording head 31. More specifically, the head mounting member 41 is fixed to the side surface 31*a* without clearance.

The wiping operation in the image forming apparatus 1 having the above configuration will be described with reference to FIG. 4A and FIG. 4B. The wiping operation is performed, for example, after purging the ink in the nozzles of the recording head 31. During the wiping operation, as described above, the wiper carriage 65 (see FIG. 3) of the wiping unit 63 moves in the wiping direction X, and the wiper 67 wipes the nozzle area N. Because the wiper 67 is pressed against the nozzle area N at a predetermined pressure, it curves downstream in the wiping direction X, as shown in FIG. 4A. In addition, since the width of the wiper 67 is slightly wider than that of the nozzle area N, both the end portions of the wiper 67 project upward from the nozzle area N when pressed against the nozzle area N, as shown in FIG. 4B.

The ink L wiped by the wipers 67 is pushed up (rises) from both the end portions of the wipers 67 to the side surfaces 31*a* of the recording head 31. The risen ink eventually reaches the head mounting member 41 and then enters the recess portions 45.

However, the head mounting member 41 has higher water repellency than the side surface 31*a* of the recording head 31 and is hard to fit with the ink, so the ink is repelled from the recess portions 45. The ink repelled from the recess portions 45 moves downward along both the side surfaces of the recess portion 45, that is, along the side surfaces of the two protrusion portions 43 adjacent to the recess portion 45. As a result, the ink entering the two adjacent recess portions 45 collects at the tip end (the lower end) of one protrusion portion 43 between the two recess portions 45. Then, the amount of collected ink increases, and it tends to drop from the lower end of the protrusion portion 43 due to its own weight. Thus, the ink drops from the recess portions 45 and is less likely to accumulate on the side surface 31*a* of the recording head 31.

As is clear from the above description, according to the present disclosure, the ink that rises on the side surface 31*a* of the recording head 31 and enters the recess portions 45 during the wiping operation moves downwards along the protrusion portions 43 and tends to drop from the lower ends of the protrusion portions 43 due to its own weight. Therefore, at the end of the wiping operation, the ink can be prevented from adhering to or accumulating on the side surface 31*a* of the recording head 31, or the amount of ink adhering to or accumulating on the side surface 31*a* of the recording head 31 can be reduced. Therefore, the dropping of the ink from the side surface 31*a* of the recording head 31 during the image forming operation can be prevented or reduced, and the image failure and contamination of the inside of the apparatus can be prevented.

In addition, since the recess portion 45 is larger in width as goes downward, the contact area between the side surface of the recess portion 45 and the ink becomes relatively narrow, so that the ink entering the recess portion 45 is hardly remained. In addition, since the protrusion portion 43 is smaller in width as goes downward, the ink tends to collect from the recess portions 45 on both sides of the protrusion portion 43 to the lower end of the protrusion portion 43. Therefore, the dropping of the ink entering the recess portion 45 can be accelerated. Furthermore, since the risen ink does not get into the space between the head mounting member 41 and the side surface 31*a* of the recording head 31, the accumulation of the ink can be more reliably prevented.

Figure 5A:
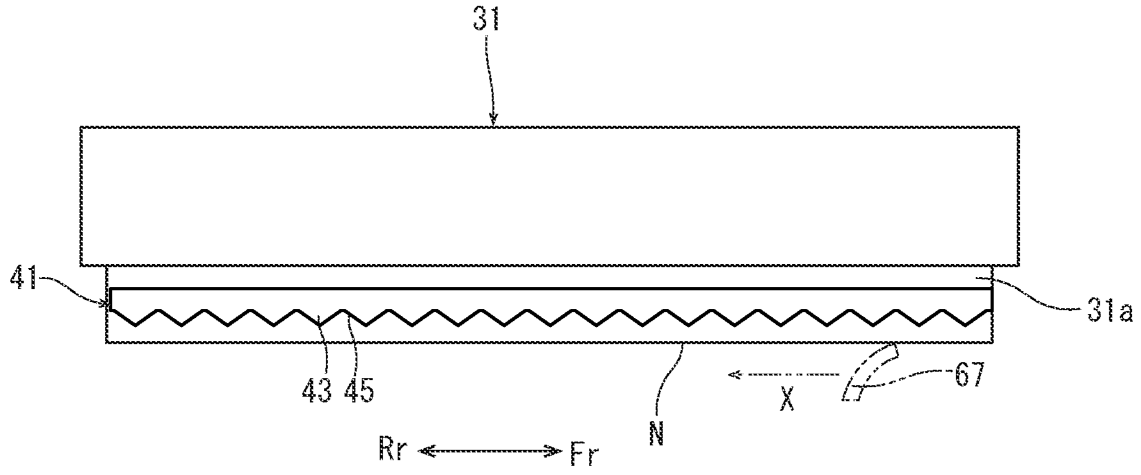
FIG. 5A is a side view showing a first modified example of the recording head of the image forming apparatus according to one embodiment of the present disclosure.
Figure 5B:
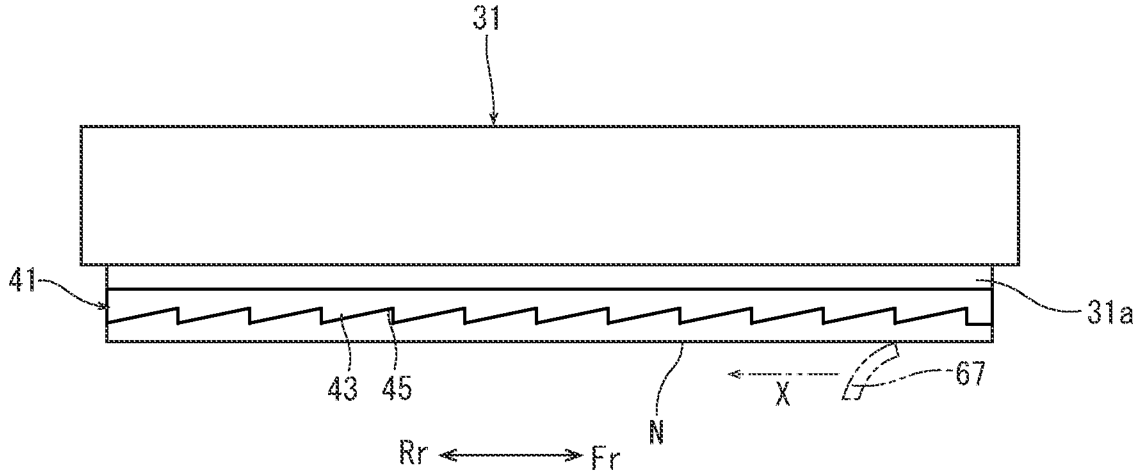
FIG. 5B is a side view showing a second modified example of the recording head of the image forming apparatus according to one embodiment of the present disclosure.
Figure 5C:
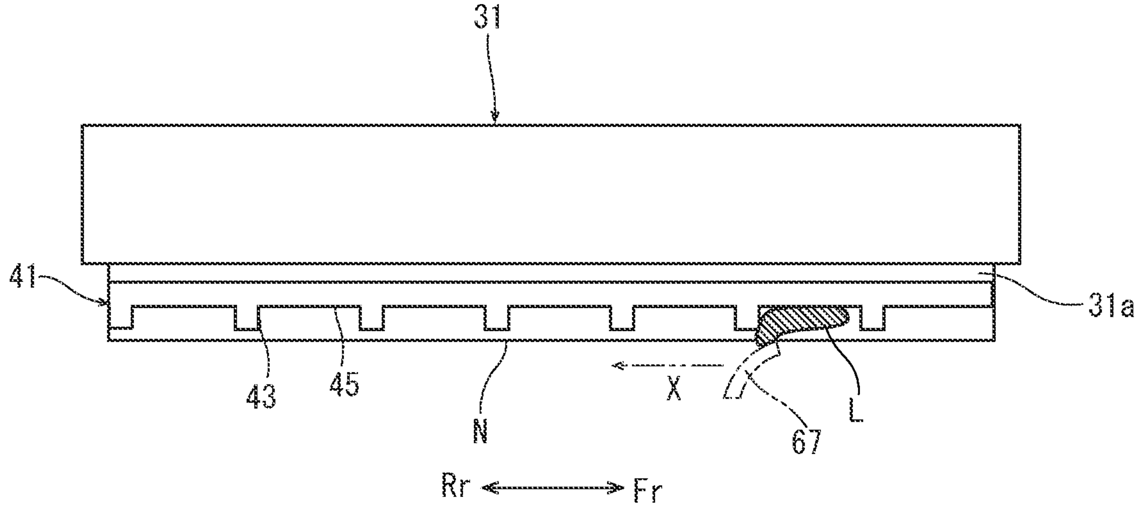
FIG. 5C is a side view showing a third modified example of the recording head of the image forming apparatus according to one embodiment of the present disclosure.

Next, the first to third modified examples of the recording head 31 will be described with reference to FIG. 5A to FIG. 5C. FIG. 5A to FIG. 5C are side views of the recording head 31 as viewed from the left side.

First, the first modified example will be described with reference to FIG. 5A. In the first modified example, the lower end portion of the head mounting member 41 has a triangular wavey concave-and-convex shape in which a triangular downward protrusion portion 43 protruding downward and a triangular upward recess portion 45 recessed upward are alternately formed when viewed from the left-and-right direction. Specifically, the protrusion portion 43 is smaller in width as goes downward, and the recess portion 45 is larger in width as goes downward.

In the first modified example, as in the above embodiment, the ink L entering the two adjacent recess portions 45 moves downward along one protrusion portion 43 between the two recess portions 45 and collects at the lower end of the protrusion portion 43. When the amount of collected ink increases, the ink drops from the protrusion portion 43 due to its own weight, so that the ink is less likely to accumulate on the side surface 31*a* of the recording head 31.

Next, the second modified example will be described with reference to FIG. 5B. In the second modified example, the lower end portion of the head mounting member 41 is shaped into a seesaw blade when viewed from the left-and-right direction. That is, a right-angled triangular protrusion portion 43 protruding downward and a right-angled triangular recess portion 45 recessed upward are alternately formed. The protrusion portion 43 is smaller in width as goes downward, and the recess portion 45 is larger in width as goes downward. The recess portion 45 is formed so that the downstream side surface in the wiping direction X is vertical and the upstream side surface is inclined.

In the second modified example, the ink risen up on the side surface 31*a* of the recording head 31 is pushed downstream in the wiping direction X with the movement of the wiper 67 in the wiping direction X, pressed against the inclined side surface of the recess portion 45, and tends to collect at the tip of the protrusion portion 43 along the inclined side surface. By making it easy for the ink to collect at the tip of the protrusion portion 43 in this way, the dropping of the ink from the tip of the protrusion portion 43 can be accelerated.

Next, the third modified example will be described with reference to FIG. 5C. In the third modified example, the lower end portion of the head mounting member 41 is formed with rectangular protrusion portions 43 at predetermined intervals along the wiping direction X when viewed from the left-and-right direction. Thus, a rectangular recess portion 45 is formed between the adjacent protrusion portions 43 when viewed from the left-and-right direction. The width of the protrusion portion 43 along the wiping direction X is narrower than the width of the recess portion 45.

In the third modified example, the ink L risen up on the side surface 31*a* of the recording head 31 and entering the recess portion 45 is pushed downstream in the wiping direction X with the movement of the wiper 67 in the wiping direction X, and is blocked by the protrusion portion 43. The blocked ink L is collected at the lower end of the protrusion portion 43, and easily drops from the protrusion portion 43 due to its own weight.

Figure 6:
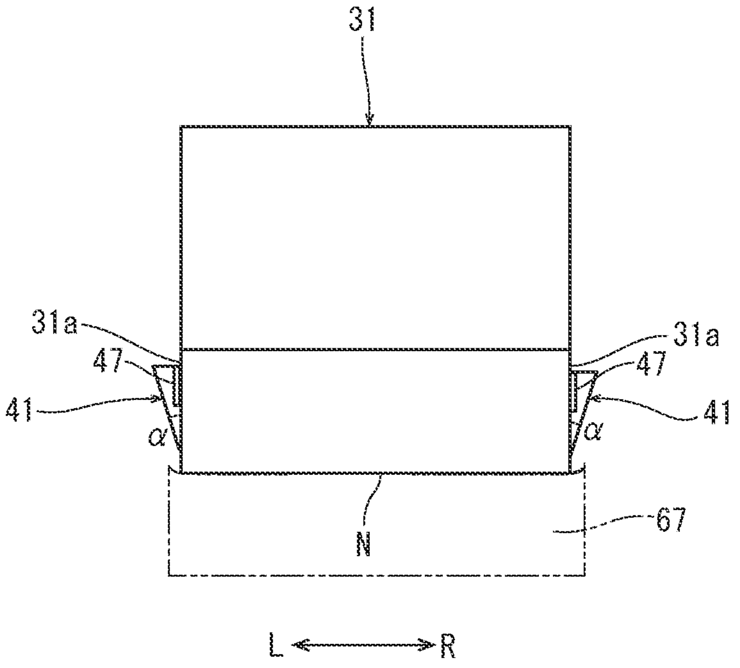
FIG. 6 is a front view showing a fourth modified example of the recording head of the image forming apparatus according to one embodiment of the present disclosure.

Next, a fourth modified example will be described with reference to FIG. 6. FIG. 6 is a front view of the recording head 31.

In the fourth modified example, the angle α formed by the lower side surface of the head mounting member 41 and the side surface 31*a* of the recording head 31 is formed to be an acute angle. The head mounting member 41 is fixed to the side surface 31*a* of the recording head 31 by, for example, an adhesive 47. The adhesive 47 is applied to the upper portion of the head mounting member 41. In the fourth modified example, the contact area between the ink risen up along the side surface 31*a* of the recording head 31 and the head mounting member 41 becomes narrow, so that the ink L is less likely to be held in the corner between the head mounting member 41 and the side surface 31*a* of the recording head 31, and the dropping of the ink can be therefore accelerated.

Figure 7A:
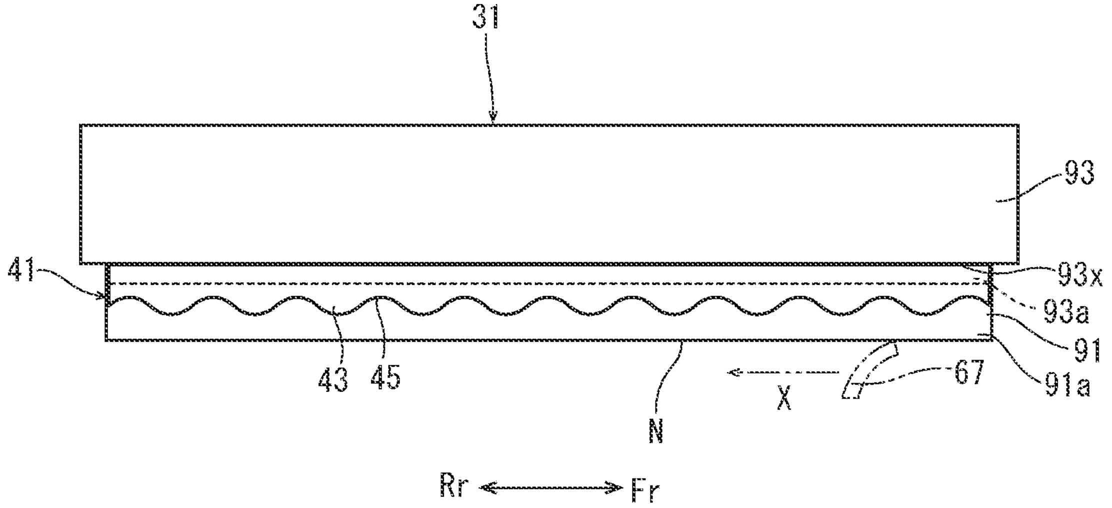
FIG. 7A is a side view showing a fifth modified example of the recording head of the image forming apparatus according to one embodiment of the present disclosure.
Figure 7B:
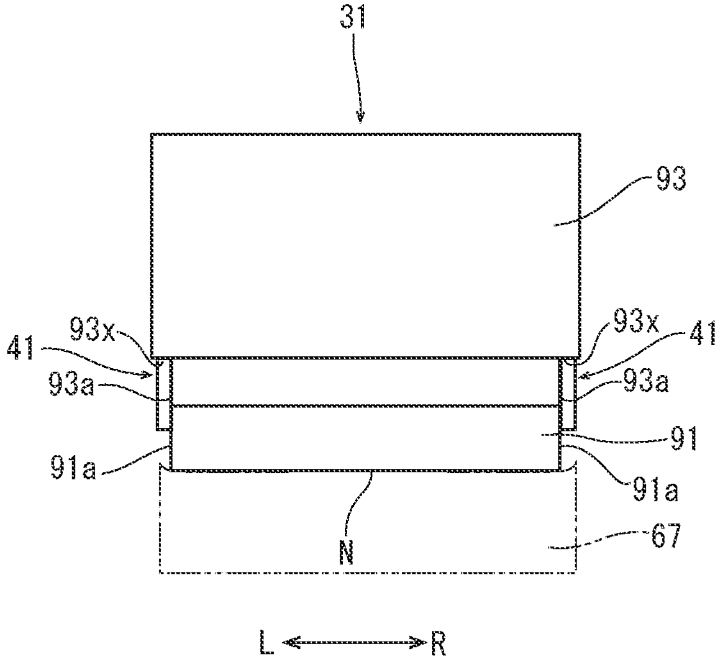
FIG. 7B is a front view showing the fifth modified example of the recording head of the image forming apparatus according to one embodiment of the present disclosure.

Next, a fifth modified example of the recording head 31 will be described with reference to FIG. 7A and FIG. 7B. FIG. 7A is a side view showing the recording head 31, and FIG. 7B is a front view showing the recording head 31.

The recording head 31 of the fifth modified example is provided with an ejecting part 91 and a reservoir 93. On the lower surface of the ejecting part 91, the ink ejection ports of the nozzles are opened. The area where the ink ejection ports are opened on the lower surface of the ejecting part 91 is defined as the nozzle area N. The reservoir 93 is stacked above the ejecting part 91 via a piezoelectric element, and supplies the ink to the ejecting part 91.

The reservoir 93 is formed into a rectangular parallelepiped shape, has an upper part and a lower part communicating with the ejecting part 91, and is formed such that the width in the left-and-right direction is wider at the lower part than at the upper part. This forms a flat stepped surface 93*x* facing downward in the side surface of the reservoir 93.

The head mounting members 41 are formed along the wiping direction X on both the side surfaces 93*a* of the lower part of the reservoir 93 and on both the side surfaces 91*a* of the ejecting part 91. The head mounting member 41 has water repellency higher than the side surfaces of the recording head 31, more specifically, both the side surfaces 91*a* of the ejecting part 91. The head mounting member 41 is formed into a parallelepiped shape having a rectangular cross section long in the upper-and-lower direction when viewed from the front-and-rear direction. The upper end surface of the head mounting member 41 is a straight flat surface, and the lower end is formed to be wavey with the protrusion portion 43 and the recess portion 45 alternately arranged. In addition, the thickness of the head mounting member 41 (the length along the left-and-right direction) is larger than the height of the stepped surface 93*x* (the length along the left-and-right direction). In addition, the height (the length along the upper-and-lower direction) of the head mounting member 41 is shorter than the height (the length along the upper-and-lower direction) of the lower part of the reservoir 93 and the ejecting part 91. That is, both the side surfaces 93*a* of the lower part of the reservoir 93 are covered with the head mounting member 41. The head mounting member 41 should, but does not necessarily, cover the entire lower side surfaces 93*a* of the reservoir 93. If both the side surfaces 93*a* of the lower part of the reservoir 93 will be exposed below the head mounting member 41, the head mounting member 41 may has water repellency higher than both the side surfaces 93*a* of the lower part of the reservoir 93, but not necessarily so.

The upper end surface of the head mounting member 41 is abutted against the stepped surface 93*x*, and fixed to the stepped surface 93*x* using an adhesive or a double-sided tape. In addition, the side surface of the head mounting member 41 is located inside the side surface of the upper part of the reservoir 93. Furthermore, the lower end surface of the head mounting member 41 is located above the nozzle area N of the ejecting part 91.

Even in the recording head 31 having the above configuration, the ink L wiped by the wipers 67 is pushed up (risen up) from both the end portions of the wipers 67 to the side surfaces 91*a* of the ejecting part 91 of the recording head 31. The risen ink, as described above, enters the recess portion 45, is repelled from the recess portion 45, and moves downward along the side surfaces of the two protrusion portions 43 adjacent to the recess portion 45, making it easy to drop from the lower end of the protrusion portion 43 by its own weight. In this way, the ink drops from the recess portion 45 and is less likely to accumulate on the side surface of the recording head 31.

As described above, according to the recording head 31 of the present disclosure, since the upper end surface of the head mounting member 41 is abutted against the stepped surface 93*x*, a positioning of the head mounting member 41 to the recording head 31 can be easily performed. Furthermore, since the upper end surface of the head mounting member 41 is formed in a flat straight surface, the contact area between the upper end surface and the stepped surface 93*x* can be increased, and the head mounting member 41 and the recording head 31 can be firmly fixed. Furthermore, since both the side surfaces of the head mounting member 41 are positioned inside both the side surfaces of the recording head 31, the contact between the head mounting member 41 and the surrounding members is prevented, and the head mounting member 41 is less likely to be peeled off. Furthermore, since the lower end portion of the head mounting member 41 is positioned above the nozzle area N, the possibility in which the head mounting member 41 comes into contact with the recording medium such as a sheet can be reduced, and the breakage of the head mounting member 41 can be suppressed.

The head mounting member 41 may be provided integrally with the recording head 31 and the surface may be machined to have higher water repellency than the side surface 31*a* of the recording head 31.

While this disclosure has been described for specific embodiment(s), this disclosure is not limited to the above. To the extent that it does not deviate from the scope and spirit of this disclosure, a person skilled in the art may modify the above embodiment.

The invention claimed is:

1. An image forming apparatus comprising:

a recording head provided with a nozzle area where a number of ink ejection ports are opened downward; and a wiper configured to move in a wiping direction while coming into contact with the nozzle area to wipe the nozzle area;

a head mounting member provided on a side surface of the recording head in the wiping direction;

a surface of the head mounting member having water repellency higher than the side surface of the recording head; and a recess portion and a protrusion alternatively provided in a lower end portion of the head mounting member.

2. The image forming apparatus according to claim 1, wherein the protrusion portion is smaller in width as goes downward, and the recess portion is larger in width as goes downward.

3. The image forming apparatus according to claim 1, wherein the lower end portion of the head mounting member has a wave-shape, a seesaw blade-shape or a rectangular wave-shape.

4. The image forming apparatus according to claim 1, wherein an angle between a lower side surface of the head mounting member and the side surface of the recording head is an acute angle.

5. The image forming apparatus according to claim 1, wherein the head mounting member is fixed to the side surface of the recording head without clearance.

6. An ejecting unit comprising:

a recording head elongated in one direction and provided with a nozzle area where a number of ink ejection ports are opened downward;

a head mounting member provided on a side surface of the recording head in a longitudinal direction of the recording head;

a surface of the head mounting member having water repellency higher than the side surface of the recording head; and a recess portion and a protrusion portion alternatively provided in a lower end portion of the head mounting member.

7. The ejecting unit according to claim 6, wherein the protrusion portion is smaller in width as goes downward, and the recess portion is larger in width as goes downward.

8. The ejecting unit according to claim 6, wherein the lower end portion of the head mounting member has a wave-shape, a seesaw blade-shape or a rectangular wave-shape.

9. The ejecting unit according to claim 6, wherein an angle between a lower side surface of the head mounting member and the side surface of the recording head is an acute angle.

10. The ejecting unit according to claim 9, wherein a lower end portion of the head mounting member is located above the nozzle area of the recording head.

11. The ejecting unit according to claim 6, wherein the recording head includes:

an ejecting part provided with the ink ejection ports;

a reservoir disposed above the ejecting part and configured to supply the ink to the ejecting part;

a stepped surface facing downward disposed on a side surface of the reservoir in the longitudinal direction of the recording head; and the head mounting member being in contact with the stepped surface.

12. The ejecting unit according to claim 11, wherein an upper end portion of the head mounting member has a flat shape.

13. The ejecting unit according to claim 11, wherein a side surface of the head mounting member is located inside the stepped surface of the reservoir.

14. An image forming apparatus comprising:

the ejecting unit according to claim 6; and a wiper configured to move in a wiping direction while coming into contact with the nozzle area to wipe the nozzle area.

* * * * *